US010015683B1

(12) United States Patent
Amiri et al.

(10) Patent No.: US 10,015,683 B1
(45) Date of Patent: Jul. 3, 2018

(54) DEVICE OPTIMIZATION ACROSS WIRELESS LOCAL AREA NETWORKS

(71) Applicant: Quantenna Communications, Inc., Fremont, CA (US)

(72) Inventors: Bahador Amiri, Saratoga, CA (US); Steve Schultz, Danville, CA (US); Safiali Rouhi, Oakland, CA (US)

(73) Assignee: Quantenna Communications, Inc, Fremont, CA (US)

( * ) Notice: Subject to any disclaimer, the term of this patent is extended or adjusted under 35 U.S.C. 154(b) by 146 days.

(21) Appl. No.: 14/929,331

(22) Filed: Oct. 31, 2015

Related U.S. Application Data (60) Provisional application No. 62/073,604, filed on Oct. 31, 2014.

(51) Int. Cl.
| | |
|---|---|
| *H04W 28/06* | (2009.01) |
| *H04W 28/02* | (2009.01) |
| *H04W 84/12* | (2009.01) |
| *H04W 24/02* | (2009.01) |

(52) U.S. Cl.
CPC ....... *H04W 24/02* (2013.01); *H04W 28/0231* (2013.01); *H04W 28/06* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2013/0272285 A1* | 10/2013 | Goldsmith | ............ | H04W 24/02 370/338 |
| 2015/0271829 A1* | 9/2015 | Amini | .................... | H04W 24/02 370/329 |
| 2015/0289142 A1* | 10/2015 | Abeysekera | .......... | H04W 24/02 370/338 |
| 2015/0312805 A1* | 10/2015 | Cui | ....................... | H04W 80/04 370/331 |
| 2015/0365946 A1* | 12/2015 | Luong | ............... | H04W 72/0453 370/329 |
| 2016/0044673 A1* | 2/2016 | Liu | ................... | H04W 72/0453 370/329 |

(Continued)

*Primary Examiner* — Charles C Jiang
*Assistant Examiner* — George Atkins, Jr.
(74) *Attorney, Agent, or Firm* — IP Creators; Charles C Cary (57) ABSTRACT

A system for optimizing communications on a plurality of wireless local area networks (WLAN)s each supporting wireless communications between a wireless access point (WAP) node and associated station nodes. The system includes: a link aggregator, a link categorizer and a link protocol identifier. The link aggregator is configured to aggregate information about communication links across all the WLANs including communication parameters associated with each link. The link categorizer is coupled to the link aggregator and configured to categorize the aggregated communication links by at least the station type associated therewith. The link protocol identifier is coupled to the link categorizer, and configured to identify any variations in the communication parameters utilized by the various WLANs for communication links with stations of a selected type, and further to identify any such variations in the communication parameters associated with relatively higher throughput to the stations of the selected type.

2 Claims, 4 Drawing Sheets

Identify Devices that are NOT performing well and Initiate Protocol to Explore TX-RX Parameter Adjustments (56) References Cited

U.S. PATENT DOCUMENTS

| | | | | |
|---|---|---|---|---|
| 2016/0338024 A1* | 11/2016 | Xia | ..................... | H04L 1/0003 |
| 2017/0142644 A1* | 5/2017 | Yun | ..................... | H04L 67/303 |
| 2017/0181189 A1* | 6/2017 | Luo | ..................... | H04W 74/08 |

* cited by examiner

FIG. 1A  Identify WLAN where Phablet is Performing Well and Promulgate Link Parameters to other WLANs FIG. 1B  Identify Devices that are NOT performing well and Initiate Protocol to Explore TX-RX Parameter Adjustments

Inter WLAN Device Optimization　　　　　　　FIG. 3

DEVICE OPTIMIZATION ACROSS WIRELESS LOCAL AREA NETWORKS

CROSS REFERENCE TO RELATED APPLICATION

This application claims the benefit of prior filed Provisional Application No. 62/073,604 filed on Oct. 31, 2014 entitled "Method and Apparatus for Adaptive Cloud Optimization of Transmission Link in Wireless Local Area Network" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods of increasing concurrent communications thereon.

2. Description of the Related Art

Wireless networks, a.k.a. wireless local area networks (WLAN) are established using multiple centrally controlled devices called Wireless Access Points (WAP)s. Each WAP wirelessly couples all associated devices, e.g. wireless stations such as: computers, printers, televisions, security cameras across the entire enterprise to one another and to the Internet. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the protocols, e.g. "a", "b", "g", "n", "ac", "ad", "ah", "aj", "ax", "ay" specified in the IEEE 802.11 standard. Communications follow a hub and spoke model with each WAP at the hub and the spokes corresponding to the wireless links to each 'client' device. A communication from a transmitting WAP to one of its associated receiving stations is identified as a downlink communication. Conversely, a communication from a transmitting station to its receiving WAP with which it is associated is identified as an uplink communication.

Each WAP uses a selected communication channel to support communications with its associated stations on the Wireless Local Area Network (WLAN) formed thereby. Access to the communication channel utilized by each WLAN relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use. A WLAN operative in this manner is said to implement: CSMA\CA where the "CA" moniker signifies collision avoidance as the connectionless access coordination methodology.

Communications on the single communication medium are identified as "simplex" meaning, communications from a single source node to one target node at one time, with all remaining nodes capable of "listening" to the subject transmission. Starting with the IEEE 802.1 ac standard and specifically 'Wave 2' thereof, discrete communications from a single WAP to more than one target station at the same time may take place using what is called Multi-User (MU) multiple-input multiple-output (MIMO) capability of the WAP. MU capabilities were added to the standard to enable the WAP to communicate with multiple single antenna single stream stations concurrently.

In dense wireless environments, such as Auditoriums, Offices, Condominiums and Apartments there may be hundreds of WAPs each supporting communications of hundreds of associated wireless stations each with differing capabilities and communication requirements.

What is needed are improved methods for increased throughput of wireless local area networks (WLAN).

SUMMARY OF THE INVENTION

The present invention provides a system, method and apparatus for rapid identification of variances in the performance of each type of station across wireless local area networks (WLAN)s and rapid diagnosis of the changes in communication parameters required to 'globally' improve the performance of each identified station type across all WLANs.

A system for optimizing communications on a plurality of wireless local area networks (WLAN)s each supporting wireless communications between a corresponding wireless access point (WAP) node and associated station nodes on a selected one of a plurality of communication channels is disclosed. The system includes: a link aggregator, a link categorizer and a link protocol identifier. The link aggregator is configured to aggregate information about communication links across all the WLANs including communication parameters associated with each link. The link categorizer is coupled to the link aggregator and configured to categorize the aggregated communication links by at least the station type associated therewith. The link protocol identifier is coupled to the link categorizer; and configured to identify any variations in the communication parameters utilized by the various WLANs for communication links with stations of a selected type, and further configured to identify any such variations in the communication parameters associated with relatively higher throughput to the stations of the selected type.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1A:
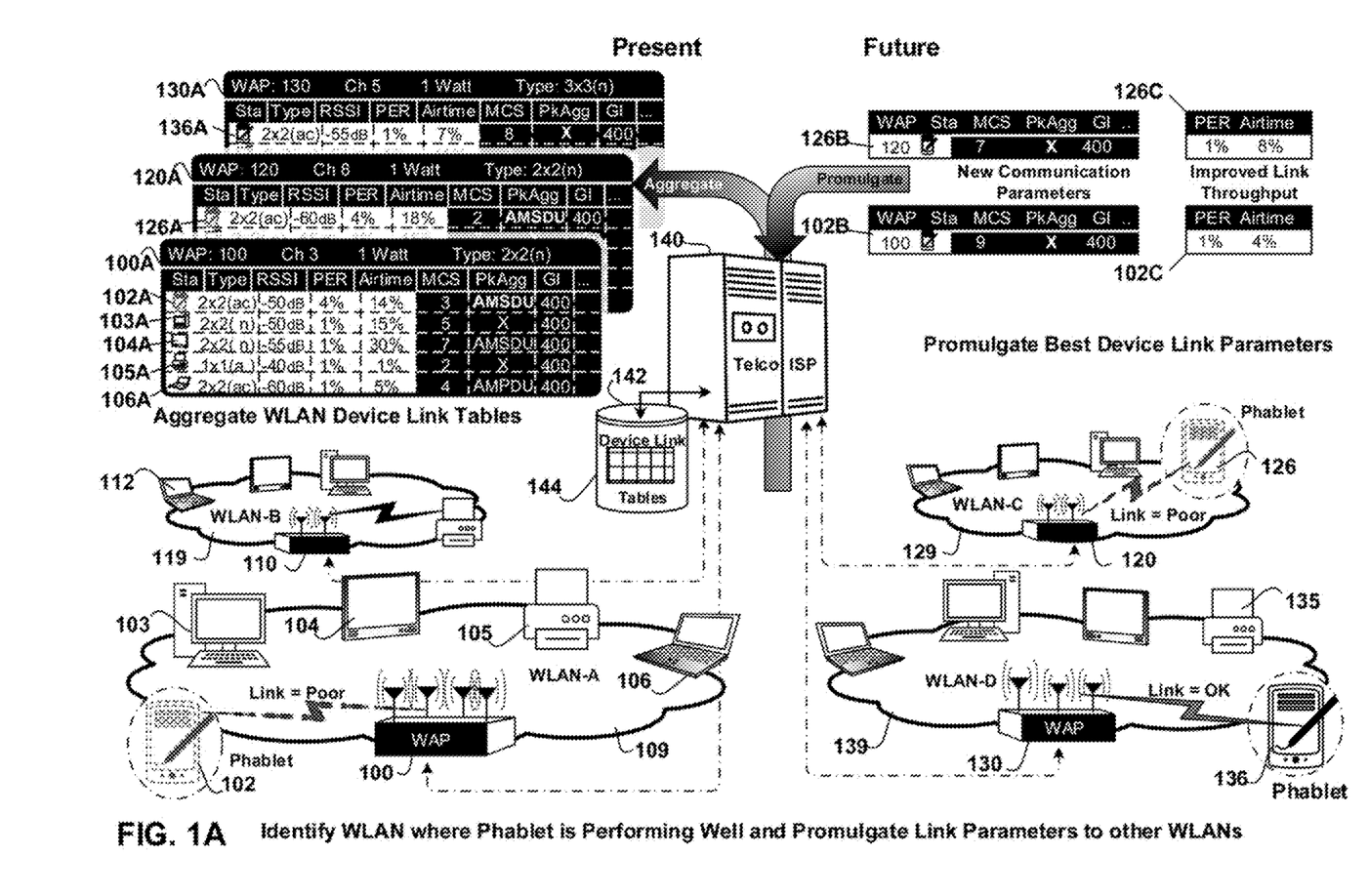
FIGS. 1A-B are combined system and data views of alternate embodiments of the invention for optimizing device performance across WLANs.
Figure 1B:
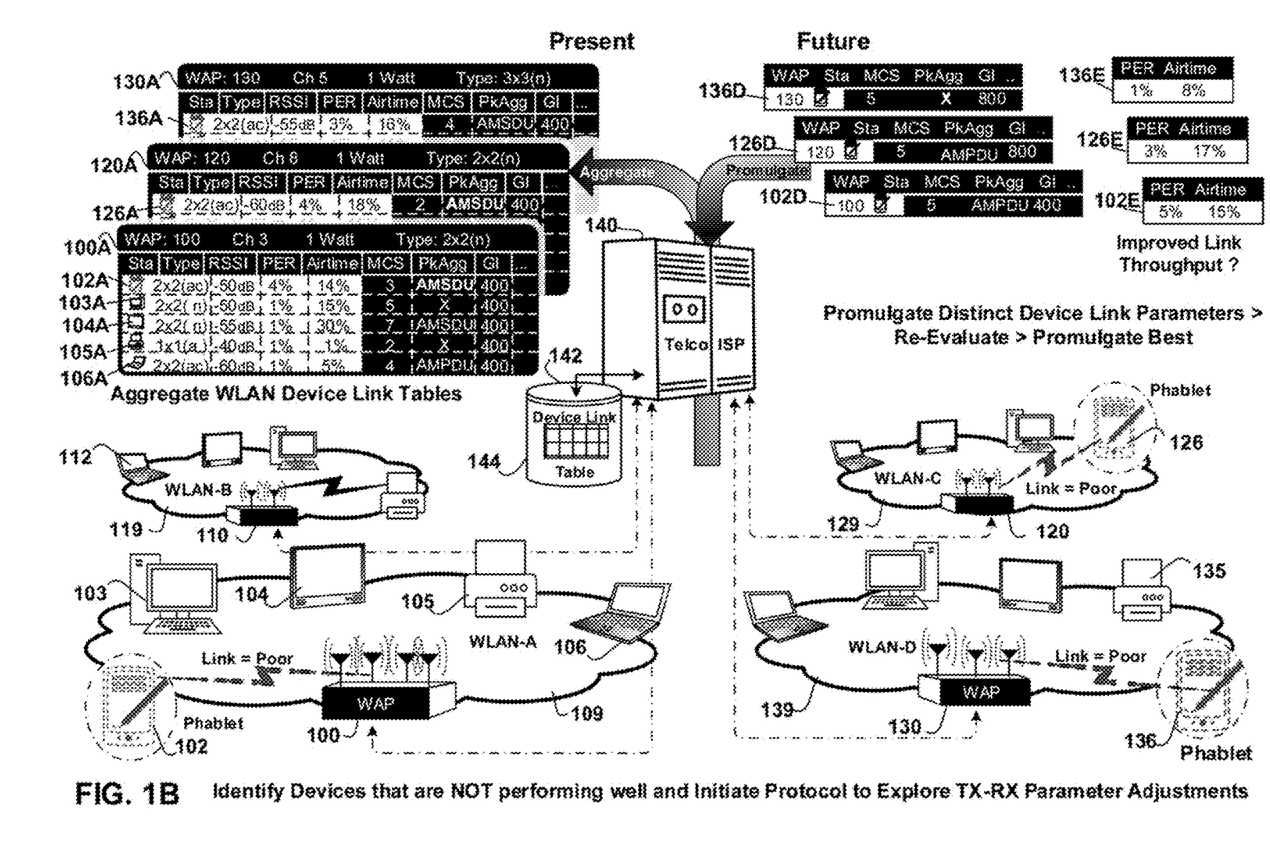

FIGS. 1A-B are combined system and data views of alternate embodiments of the invention for optimizing device performance across WLANs.

Multiple WLANs 109, 119, 129 and 139 are shown coupled to a 'cloud' server 140 operated for example by a Telco or Internet Service Provider. Each WLAN is operable in a corresponding subscriber's home. Each WLAN has its own Service Set Identifier (SSID). Each WLAN includes a wireless access point (WAP) wirelessly connecting all the homeowner/subscribers associated wireless devices, a.k.a. stations. WLAN 109 connects wireless stations to each other and to the Internet. WLAN 109 includes stations, e.g. phablet 102, desktop computer 103, HDTV 104, printer 105 and notebook computer 106 all of which support wireless communications with WAP 100 in accordance with one or more of the protocols: "a", "b", "g", "n", "ac", "ad", "ah", "aj", "ax", "ay" specified in the ever evolving IEEE 802.11 standard. WLAN 119 includes WAP 110 which connects its wireless stations, e.g. notebook computer 112, to each other and to the Internet. WLAN 129 includes WAP 120 which connects its wireless stations, e.g. phablet 126, to each other and to the Internet. WLAN 139 includes WAP 130 which connects its wireless stations, e.g. printer 135 and phablet 136, to each other and to the Internet.

Several of the WLANs, i.e. WLANs 109, 129, 139 include for the sake of example a new station type, e.g. the newly released phablet, purchased independently by each subscriber/homeowner. In the example shown in FIG. 1A, the phablet is performing very erratically on two of the three WLANs where it is found. Specifically, the communication link between WAP 100 and phablet 102 on WLAN 109 is poor, as is the communication link between WAP 120 and phablet 126 on WLAN 129. The only WLAN where that particular type of station is performing well is WLAN 139 where the communication link between WAP 130 and phablet 136 is 'OK'.

In an embodiment of the invention, these and other identifiable differences in communication parameters used by each WAP to communicate with a given "newly released device", e.g. the phablet, are correlated across WLANs to determine which if any combination of communication parameters is successful. The successful communication parameter combination that one WAP might arrive at in establishing a communication link with the "new device" is then shared with other WLANs serviced by the Telco or ISP. This reduces service calls to the Telco/ISP otherwise triggered by unsatisfactory performance of the newly released wireless device on other subscriber's WLANs.

Each WLAN and specifically the corresponding WAP thereof is coupled to the 'cloud' server 140. The Telco/ISP 'cloud' server 140 uploads the communication parameters associated with each communication link between WAP and station. These parameters are stored by the server 140 in its storage 142 as resultant device link tables 144. The Telco/cloud server in an embodiment of the invention, then executes processes to: a) categorize the communication links by station type; b) and identify which communication parameters if any are associated with good, e.g. acceptable throughput, communication links to each station type, and which are not. This rapid categorization and identification allows generally reduced timelines for resolving connectivity issues associated with a given device type.

In the example shown in FIG. 1A, device link tables 100A, 120A, and 130A for WLANs 109, 129, 139 respectively are shown. Each table includes communication parameters for each link supported by the WAP. In the example each row is a record for the associated link on the corresponding WLAN.

Those communication parameters which help to identify one or both of the devices, i.e. station and WAP, corresponding with each link, range from the specific to the general. Examples of those communication parameters with specifically identify a device include: Vendor-ID, or Organizationally Unique Identifier (OUI), which may be present in either the: WAP beacon, Association Request, or Probe Request or Response frames for example. Examples of those communication parameters which generally identify a device include: the supported IEEE 802.11 protocols; the number of supported streams; support for Dynamic Frequency Selection (DFS); support for Quality of Service (QOS); any supported authentication protocols; and any supported packet aggregation, e.g. Aggregated Media Access Control Protocol Data Unit (AMPDU) or Aggregated Media Access Control Service Data Unit (AMSDU). These may be present in either the: WAP beacon, Association Request frames for example. Other communication parameters which allow more abstract device fingerprinting and identification may be extracted from the MAC or PHY layer of each communication link.

Those communication parameters which help to identify the performance of the link as 'good' or 'bad' in terms of throughput include: the airtime requirements of the link, the Packet Error Rate (PER) of the link, the Quality of Service (QOS) of the link, and the bit rate of the link for example. The throughput of the link may further be identified as good or bad in terms of both the above referenced rate based parameters together with the bandwidth requirements of the link.

Device link table 100A lists these representative communication link parameters in rows 102A-106A for each link on WLAN 109. The communication parameters for the link between WAP 100 and phablet 102 are listed on row 102A of the device link table 100A. On WLAN 109 the link between phablet and WAP is poor as evidenced by the high airtime requirement of 14% and the high Packet Error Rate (PER) of 4%. Device link table 120A for WLAN 129 lists representative communication link parameters in its rows including row 126A for the link between the WAP 120 and the phablet 126. On WLAN 129 the link between phablet and WAP is poor as evidenced by the high airtime requirement of 18% and the high PER of 4%. Device link table 130A for WLAN 139 lists representative communication link parameters in its rows including row 136A for the link between the WAP 130 and the phablet 136. On WLAN 139 the link between phablet and WAP is good as evidenced by the relatively lower airtime requirement of 7% and the low PER of 1%.

In an embodiment of the invention the server identifies the problematic phablet to the Telco/ISP technicians or to the device vendor for resolution of the problems causing the inconsistent performance of the identified device.

In the embodiment of the invention shown in FIG. 1A, the server 140 takes the added step of using the information in the device link tables to determine any variations in communication parameters utilized by WLANs 109, 129, 139 for communication links with a selected station type, e.g. the phablet; including any variations associated with relative higher throughput links to the stations of the selected type. The variations associated with the higher throughput link established on WLAN 139 as shown in row 136A of device link table 130A, appear to be the absence of packet aggregation "X" and the short guard interval (GI) of 400 ns. The server identifies these communication parameters and promulgates them to the relevant WAPs 100 and 120 via associated control packets 102B and 1268 respectively. The WAPs 100, 120 in response, cease using either AMSDU or AMPDU packet aggregation on subsequent downlinks to the phablets. On the next upload interval of communication parameters for these links, the corresponding link parameters 102C, 126C shows the expected link improvement between WAP 100 and Phablet 102, and between WAP 120 and Phablet 126, in terms of reduced PER and link airtime requirements.

In the embodiment of the invention shown in FIG. 1B the server 140 identifies all phablet links as problematic. This determination may be made on link throughput falling substantially below an expected throughput given the capabilities of the WAP and station associated with the link and the Received Signal Strength Indicator (RSSI) of each link. As shown in WLAN table 100A, the link between WAP 100 and phablet 102 has an acceptable RSSI of −50 dBm but an unacceptably high PER at 4% and airtime at 14%. Also as shown in WLAN table 120A the link between WAP 120 and phablet 126 has an acceptable RSSI of −60 dBm but an unacceptably high PER at 4% and airtime at 18%. Similarly, as shown in WLAN table 130A the link between WAP 130 and phablet 136 has an acceptable RSSI of −55 dBm but an unacceptably high PER at 3% and airtime at 16%.

In response to the identification of the problematic device, e.g. the newly released phablets, the server takes the added step of identifying a protocol for optimizing communications with the problematic device. In an embodiment of the invention the protocol involves promulgating to each of the corresponding WAPs distinct variations in the communications parameters associated with links to the selected station type. This 'seeding' of each effected WLAN and more specifically, problematic link thereon, with distinct variations in communication parameters, allows for an exhaustive, 'brute force' approach to link optimization by trying all possible combinations of communication parameters in parallel on the effected WLANs. This seeding is shown in the form of control packets 102D, 126D and 136D each of which contain distinct combinations of Packet Aggregation and Guard Interval (GI) communication parameters which are promulgated to corresponding WLANs 109, 129, 139 and specifically the WAPs 100, 120, 130 respectively thereof. On the next upload interval of communication parameters for these links, the corresponding link parameters 102E, 126E, 136E show which of the phablet links has improved. In the example shown the change in communication parameters, e.g. no packet aggregation 'X' and an extended GI of 800 ns, used by WAP 130 for its link with phablet 136 produced a significant improvement in the links as evidenced by the reduction in both PER from 3% to 1% and in airtime requirement from 16% to 8%. This identified communication parameter combination, e.g. no packet aggregation and an extended GI, is then sent to all effected WLANs and specifically the WAPs thereof to improve the overall performance of communication links with the newly release phablet. The device link tables are updated accordingly, and thus serve as a resource or lookup table for promulgating best communication parameter combinations for each device as the Telco adds new WLANs and subscribers to its service set.

Figures 2A, 2B, 2C:
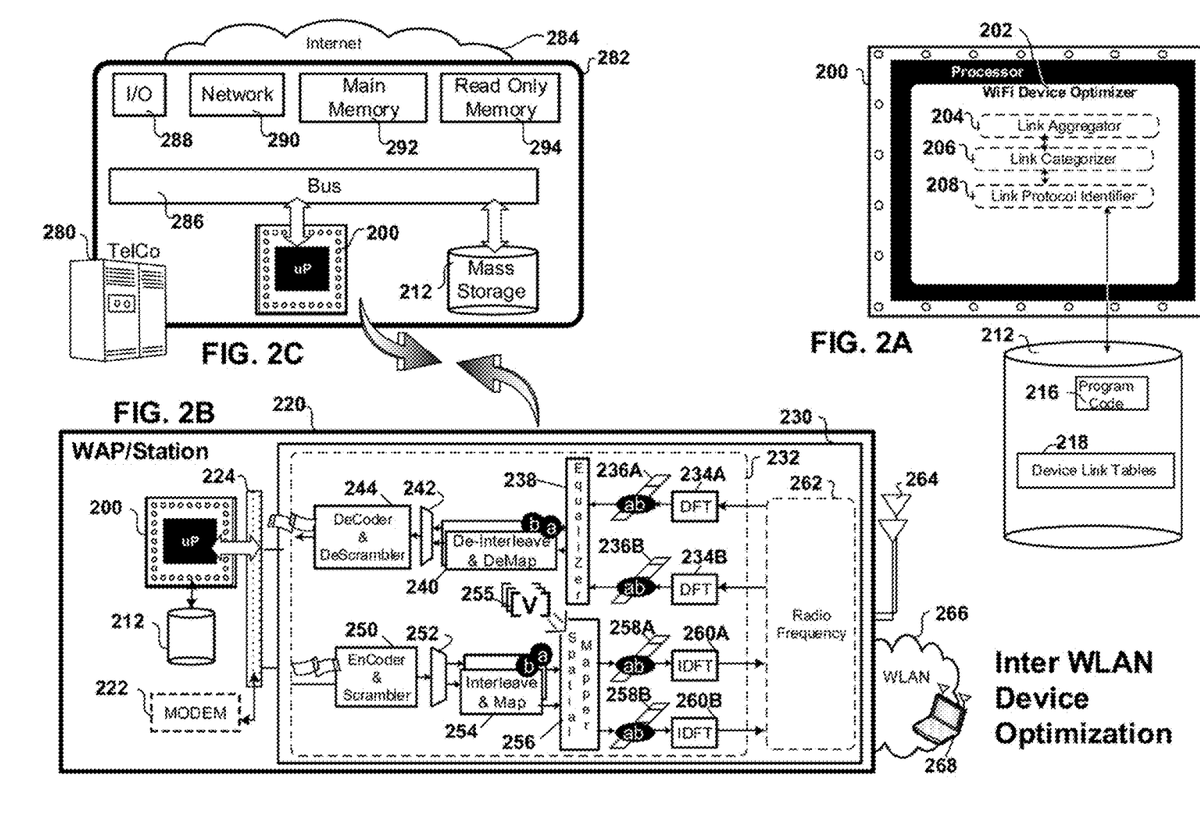
FIGS. 2A-C are hardware block diagrams of various devices configured to execute device optimization across WLANs in accordance with various embodiments of the current invention.

FIGS. 2A-C are hardware block diagrams of various devices configured to execute device optimization across WLANs in accordance with various embodiments of the current invention.

FIG. 2A shows a processor 200 and memory element or storage module 212 configured to execute Inter WLAN WiFi device optimization program code 216 associated with a WiFi device optimization controller module 202. The program code may be configured to run on a WAP or station host device in cooperation with 'cloud' server host device.

The WiFi device optimization controller module includes: a link aggregator module 204, a link categorizer module 206, and a link protocol identifier module 208. In addition to program code, the storage module 212 includes: a device link table 218.

In operation the link aggregator module 204 is configured to aggregate information about communication links across all the WLANs including communication parameters associated with each link. The link categorizer module 206 is configured to categorize the aggregated communication links by at least the station type associated therewith. The link protocol identifier module 208 is configured to identify any variations in the communication parameters utilized by the various WLANs for communication links with stations of a selected type, and further configured to identify any such variations in the communication parameters associated with relatively higher throughput to the stations of the selected type.

In an other embodiment of the invention the link protocol identifier module is further configured to promulgate to the WAPs associated with the stations of the selected type a set of communication parameters associated with relatively higher throughput thereto, thereby improving subsequent communication links therewith.

In still another embodiment of the invention the link protocol identifier module is further configured to promulgate to each of the corresponding WAPs distinct variations in the communications parameters associated with links to the selected station type, and to identify any of the distinct variations associated with relatively higher throughput to the stations of the selected type. The identified variations in communication parameters associated with the higher throughput may then be promulgated to the affected WLANs to improve the communications with the selected station type.

FIG. 2B shows a wireless access point (WAP) 220 configured as a host device servicing a WLAN 266 which includes wireless station 268. The WAP supports discrete communications with a station 268 or concurrent multiple user multiple-input multiple-output (MU-MIMO) communications with multiple stations. The WAP 220 in this embodiment of the invention is identified as a 2×2 WAP supporting as many as 2 discrete communication streams "a", "b" over two antennas 264. The WAP 220 includes: the processor 200 and storage 212; a bus 224, a WLAN stage 230 including a base band stage 232, a radio frequency (RF) stage 262 and MIMO antennas 264. The WAP RF stage supports one or more IEEE 802.11 wireless local area network (WLAN) protocols. The WAP also includes a modem 222 for coupling via copper or fiber to an Internet Service Provider (ISP) 280. The processor in addition to supporting the IEEE 802.11 WAP functionality also executes the program code which provides Device optimization across WLANs functionality as discussed above.

In the baseband stage 232 transmitted communications for user/station 268 are encoded and scrambled in encoder scrambler module 250 and de-multiplexed into two streams in demultiplexer 252. Each stream "a", "b" is subject to interleaving and constellation mapping in an associated interleaver mapper 254 and passed to the spatial mapper 256. The spatial mapper uses a beamsteering matrix 255 determined from a prior isotropic sounding of the link with station 268 to steer subsequent communications thereto. The beamsteering matrix specifies specific phase and amplitude adjustments for the communications on each antenna designed to steering the outgoing communications toward the recipient station. There is a discrete beamsteering matrix for each of the OFDM tones or sub-channels. The combined streams "ab" are injected into each of the OFDM tones or sub-channels 258A-B of the inverse discrete Fourier Transform (IDFT) modules 260A-B respectively. Each IDFT module is coupled via associated upconversion circuitry in the RF stage 262 to an associated one of the pair of antenna 264.

In the RF Stage 262 received communications "ab" on each of the two antenna 264 from user/station 268 are downconverted and supplied as input to the baseband stage 232. In the baseband stage the received communications are then transformed from the time to the frequency domain in the discrete Fourier Transform (DFT) modules 234A-B from which they are output as discrete orthogonal frequency division multiplexed (OFDM) tones/sub-carriers/sub-channels 236A-B. All received streams are then subject to equalization in equalizer 238. Received steams "ab" are subject to de-interleaving and constellation demapping in associated deinterleaver demapper modules 240, followed by multiplexing in multiplexer 242. The received data "ab" is decoded and descrambled in decoder descrambler 244.

FIG. 2C shows a Telco or ISP 280 having a server 282 configured as a host device and coupled to the Internet 284. The server includes the processor 200 and storage 212; a bus 286, an input/output (I/O) module 288 for interfacing with a user, a network module 290 for coupling to a network, a main memory 292 for storing and executing program code 216 and data, a read only memory 294 for storing bootup program code. The processor in addition to supporting the server functionality also executes the program code which provides Device optimization across WLANs functionality as discussed above.

In an embodiment of the invention the host devices may comprise: the server and multiple WAPs. In another embodiment of the invention the host device for the functionality discussed in connection with FIG. 2A may also be included in a station, in which case the system includes: the server, WAPs and stations. In an embodiment of the invention the WAP 220 performs primary aggregation of communication parameters for its links with its associated stations and the server performs secondary aggregation from the WAP of this and other WLANs. The cloud server performs the categorization of links by device type and the subsequent identification of optimal link protocols for each device type. In another embodiment of the invention each WAP categorizes each link by device type. In another embodiment of the invention each WAP filters links so that only those associated with a selected device type identified as problematic are uploaded to the server. In another embodiment of the invention the aggregation of communication link parameters resides on both WAP and stations of each WLAN.

Figure 3:
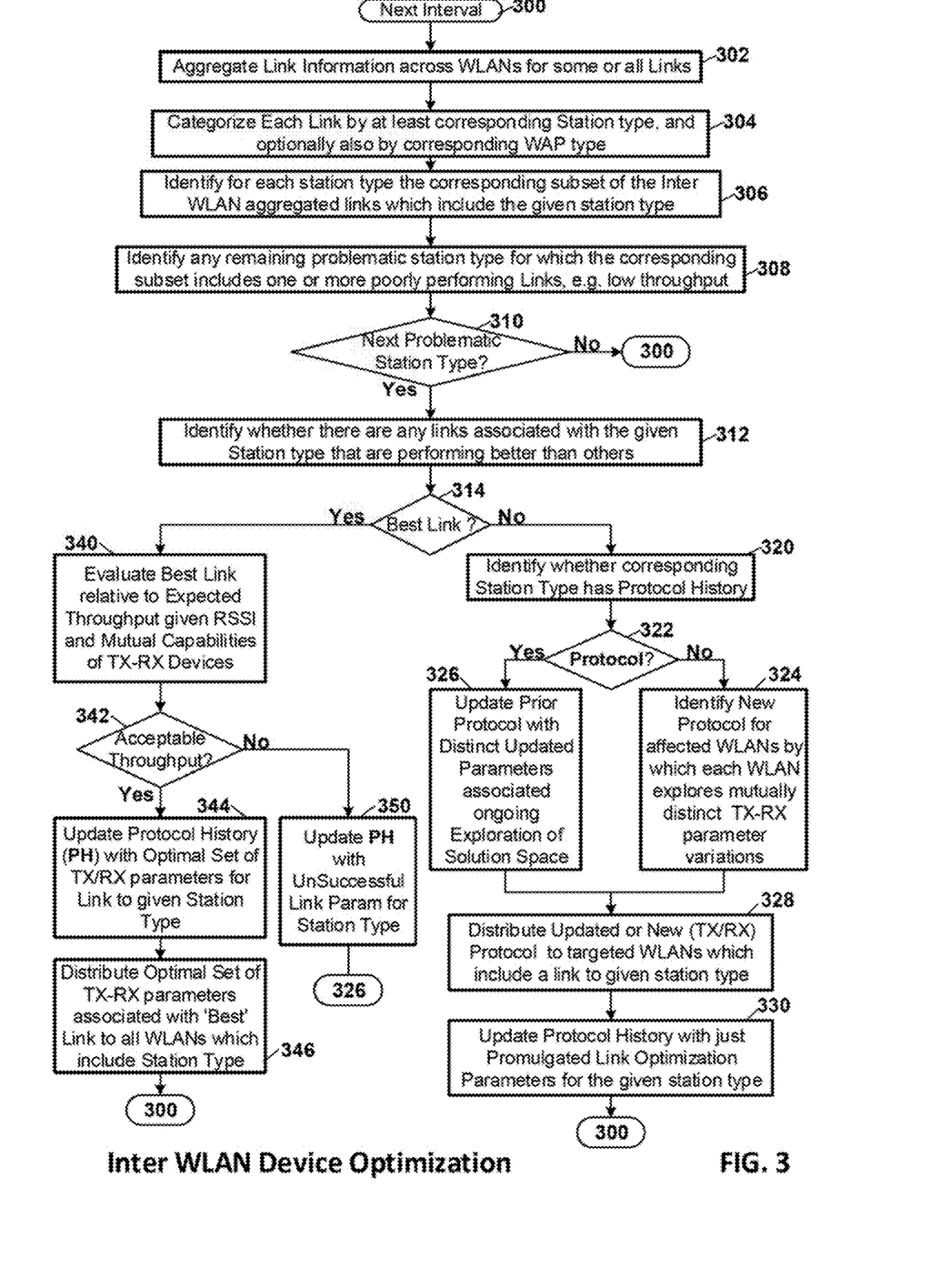
FIG. 3 is a process flow diagram of processes associated with device optimization across WLANs, in accordance with various embodiments of the current invention.

FIG. 3 is a process flow diagram of processes associated with device optimization across WLANs, in accordance with various embodiments of the current invention. Processing begins with the next communication link parameter aggregation upload interval 300. In process 302 communication link parameters are aggregated for some or all links. Control is then passed to process 304 in which each link is categorized by at least corresponding station type, and optionally also by corresponding WAP type. Next in process 306 for each station type the corresponding subset of the inter WLAN aggregated links which include the given station type are identified. Control then passed to process 308 in which any remaining problematic station type(s) are identified. Problematic station types are those for which the corresponding subset of links includes one or more poorly performing links. A poorly performing link may be identified in comparison to the relative throughput levels with respect to other links to the same station type. A poorly performing link may alternately be identified absolutely relative to an expected throughput level for a given RSSI between WAP and stations of the same type. A poorly performing link may alternately be determined based on both through put together with the bandwidth utilized by each link.

Next indecision process 310 a determination is made as to whether there are any identified problematic station types. If there are no remaining problematic station types, i.e. all corresponding links have been optimized, then control returns to process 300. If there is a next problematic station type to process, then control passes to process 312. In process 312 a determination is made as to whether there are any links associated with the given station type that are performing better than others. Next in decision process 314 a determination is made as to whether there is a best one(s) among the links to the given station type. If there is no optimized link on any WLAN for the given station type then control passes to process 320 for identification as to whether the corresponding station type has previously been processed, i.e. has a protocol history, as recorded in the device link table. If the station type has not been previously encountered, then control passes to process 324. In process 324 a new protocol for the affected WLANs is identified, by which each WLAN explores mutually distinct combinations of transmit or transmit and receive communication parameters combinations/variations. Control is then passed to process 328 for the distribution of the new protocol to the corresponding WLANs which include a link to the given station type. Alternately, if in decision process 322 it is determined that the device type has been previously encountered and thus has a protocol history, then control is passed to process 326. In process 326 an updated protocol for the affected WLANs is identified, by which each WLAN explores mutually distinct combinations of transmit or transmit and receive communication parameters combinations/variations that are not repetitive to those which have been previously explored in prior protocols. Control is then passed to process 328 for the distribution of the updated protocol to the Corresponding WLANs which include a link to the given station type. Next control passes to process 330 in which the protocol history for the given problematic station type is updated to reflect the just promulgated combinations of communication parameters. In embodiments of the invention which include the device link table the new communication parameters are added to each corresponding link record including any required timestamp indicating when addition or update change was made. Control then returns to process 300.

If alternately, in decision process 314 it is determined that there is a "best" link for the given problematic station type then control is passed to process 340. In process 340 the best link is evaluated relative to an expected throughput given the RSSI and mutual device capabilities of the transmitting and receiving devices, e.g. WAP and Station or station and WAP. The throughput may be based on bit rate alone, or bit rate per unit of bandwidth. Control is then passed to decision process 342. In decision process 342 a determination is made as to whether the best link for the problematic device has an acceptable throughput. If even the best link does not have an acceptable throughput, then control is passed to process 350. In process 350 the protocol history is updated with the unsuccessful link parameters associated with the given station type. Control is then passed to process 26 for the determination of an updated protocol by which different combinations of communication parameters can be evaluated for optimizing links to all stations of the given type.

If alternately, in decision process 342 a determination is made that the best link to the problematic device has an acceptable throughput then control is passed to process 344. In process 344 the protocol history is updated with the combination/variation in communication parameters associated with the best link to the given problematic station type. Control is then passed to process 346 in which the optimal set of TX-RX parameters associated with the 'Best' link is sent to all relevant WLANs which include the problematic station type. Control then returns to process 300.

The components and processes disclosed herein may be implemented in software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A system for optimizing wireless communications on a plurality of wireless local area networks (WLAN)s each supporting wireless communications between a corresponding wireless access point (WAP) and associated stations; and the system comprising:
a server communicatively coupled to each WAP and operable to:
aggregate information from each WAP about each communication link between the WAP and its associated stations wherein the information aggregated includes station type and communication parameters associated with transmitting and receiving each communication link;
categorize each communication link associated with the aggregated information by at least the station type associated therewith;
identify a station type as problematic for which at least one of the corresponding categorized communication links exhibits low throughput;
identify among the communication links with stations of the problematic type whether there is any relatively higher throughput communication link between one of the stations of the problematic type and its associated WAP, and if so the set of 'optimal' transmit and receive communication parameters therefore;
distribute the optimal set of communication parameters to WAPs associated with one or more of stations of the problematic type;
identify among the communication links with stations of the problematic type whether there is any relatively higher throughput communication link between one of the stations of the problematic type and its associated WAP, and if not then identifying mutually distinct combinations of transmit and receive communication parameters for each communication link with stations of the problematic station type; and
distribute the mutually distinct transmit and receive communication parameters to WAPs associated with one or more stations of the problematic type; to utilize the mutually distinct combinations of communication parameters in parallel on the WLANs
each WAP operable upon receipt from the server of the distributed optimal set of communication parameters to:
utilize said optimal set of communication parameters for transmitting and receiving each communication link with an associated station of the problematic type, to improve throughput of communications with stations of the problematic type on all WLANs.

2. A method for optimizing wireless communications, on a plurality of wireless local area networks (WLAN)s each supporting wireless communications between a corresponding wireless access point (WAP) and associated stations; and the method comprising the acts of:
aggregating on a server communicatively coupled to the WAPs, information from each WAP about each communication link between the WAP and its associated stations wherein the information aggregated includes station type and communication parameters associated with transmitting and receiving each communication link;
categorizing each communication link associated with the aggregated information by at least the station type associated therewith;
identifying a station type as problematic for which at least one of the corresponding categorized communication links exhibits low throughput;
identifying among the communication links with stations of the problematic type whether there is any relatively higher throughput communication link between one of the stations of the problematic type and its associated WAP, and if so the set of 'optimal' transmit and receive communication parameters therefore;
distributing the optimal set of communication parameters to WAPs associated with one or more of stations of the problematic type;
identifying among the communication links with stations of the problematic type whether there is any relatively higher throughput communication link between one of the stations of the problematic type and its associated WAP, and if not then identifying mutually distinct combinations of transmit and receive communication parameters for each communication link with stations of the problematic station type;
distributing the mutually distinct transmit and receive communication parameters to WAPs associated with one or more stations of the problematic type; to utilize the mutually distinct combinations of communication parameters in parallel on the WLANs,
utilizing, on the WAPs associated with stations of the problematic type, said optimal set of communication parameters distributed by the server for transmitting and receiving each communication link with any associated stations of the problematic type, to improve throughput of communications with stations of the problematic type on all WLANs.

* * * * *